United States Patent [19]

Senuma et al.

[11] Patent Number: 5,017,635

[45] Date of Patent: May 21, 1991

[54] KNEADED MOLDABLE RESIN COMPOSITION

[75] Inventors: Akitaka Senuma; Kiroku Tsukada; Isao Noda, all of Kanagawa, Japan

[73] Assignee: Union Carbide Chemicals and Plastics Company Inc., Danbury, Conn.

[21] Appl. No.: 533,820

[22] Filed: Jun. 6, 1990

[51] Int. Cl.$^5$ .............................................. C08K 5/24
[52] U.S. Cl. ................................... 524/269; 524/574; 524/570; 524/585; 524/587; 525/288; 525/313
[58] Field of Search ......................... 524/269; 525/288

[56] References Cited

U.S. PATENT DOCUMENTS 3,227,777  1/1966  Saffard ................................ 525/288
3,663,649  5/1972  Wheeler .............................. 525/288
3,865,897  2/1975  Falender et al. .................... 525/100

Primary Examiner—Joseph L. Schofer
Assistant Examiner—Mark D. Sweet
Attorney, Agent, or Firm—Bonnie L. Deppenbrock

[57] ABSTRACT

A novel kneaded moldable resin composition and the molding produced therefrom are described. The composition comprises an ethylene polymer, an organopolysiloxane, and a hydrocarbon compound expressed by the formula $CH_2=CH(CH_2)_{1-30}CH=CH_2$ and is moldable into films, sheets, tubes, and a variety of plastic parts.

2 Claims, No Drawings

KNEADED MOLDABLE RESIN COMPOSITION

BACKGROUND OF THE INVENTION

1. Field of Industrial Uses

This invention relates to a kneaded moldable resin composition which can be molded into films and tubes. Specifically this invention relates to a kneaded moldable resin composition comprising polyethylene resin, a polysiloxane polymer, and a compound having unsaturated groups on both ends thereof.

2. Prior Art

Silicone has been widely used because of its good characteristics, such as slipping properties, mold release properties, oxygen permeability, water repellency, electric insulativeness, etc. But its low mechanical strength, the difficulty of being formed into film, and poor moldability are drawbacks of silicone.

OBJECTIVES

An object of this invention is to provide a resin which improves the drawbacks of low mechanical strength, poor film forming property, poor moldability, etc. inherent to silicone.

SUMMARY

The kneaded composition according to this invention is moldable into films, sheets, tubes, etc., and the resultant moldings exhibit properties inherent to silicone. The composition is applicable to medical parts, industrial parts, electric parts, etc. Besides, the composition is usable as a modifier for improving the moldability and impact strength of the engineering plastics.

DETAILED DESCRIPTION

The inventors have studied to prepare a kneaded moldable resin which will improve the disadvantages inherent to silicone of low mechanical strength, film moldability and moldability, etc. and have successfully made this invention.

This invention provides a kneaded moldable resin composition comprising 100 weight parts of an organopolysiloxane expressed by the formula $$R_a^1 R_b^2 SiO_{\frac{4-a-b}{2}} \quad (A)$$

(wherein $R^1$ is an aliphatic unsaturated group, $R^2$ is a substituted or unsubstituted monovalent hydrocarbon group containing no aliphatic unsaturated group, $0<a<1$, $0.5<b<3$, and $1<a+b<3$); and $0.01-30$ weight parts of a hydrocarbon compound expressed by the formula $$CH_2=CH(CH_2)_cCH=CH_2 \quad (B)$$

(where c is an integer of 1–30) which are heat-kneaded, and moldings of the kneaded resin composition.

The kneaded resin composition according to this invention is moldable into films, tubes, etc. The moldings of the kneaded resin composition have an ethylene polymer and an organosilicon compound mixed not in insufficiently macro-distributed states but homogeneously.

When an ethylene polymer, and an organopolysiloxane expressed by Formula (A) are kneaded by a Banbury mixer, the mixer slips, and they are difficult to be kneaded, and even if they are kneaded, the reaction do not take place readily. But, when an organic peroxide is added, the torque increases in a short period of time, and the reaction starts. The ethylene polymer and the organopolysiloxane compound are combined. But a number of masses of the crosslinked silicone are created, and a homogeneous resin cannot be produced readily.

In order to overcome this phenomenon, the inventors have studied and found that the addition of a hydrocarbon compound expressed by Formula (B) enables a resultant resin to be homogeneous with almost no masses of crosslinked silicone. The kneaded resin composition of this invention is moldable into films and tubes by the usual molding machines for molding polyethylene, etc. The resultant films and tubes are homogeneous with substantially no masses of crosslinked silicone.

The kneaded resin composition according to this invention can be mixed with, e.g., polystyrene, nylon, polyester, polycarbonate or others so as to improve the moldability and impact resistance of the latter.

The ethylene polymer used in the composition according to this invention contains ethylene as the main component and is exemplified by high-pressure process polyethylene, linear low-density polyethylene (LLDPE), ethylene-α-olefin copolymer, ethylene-vinyl acetate copolymer, ethylene-acrylic acid copolymer, ethylene-methacrylic acid copolymer, ethylene-methyl acrylate copolymer, ethylene-methyl methacrylate copolymer, ethylene-ethyl acrylate copolymer, ethylene-ethyl methacrylate, ethylene-vinyl alcohol copolymer, ethylene-propylene-diene terpolymer, etc.

In the organopolysiloxane expressed by Formula (A) which is used in this invention, the $R^1$ group is exemplified by vinyl group, acryl group, methacryl group, etc.; and the $R^2$ group is exemplified by alkyl group, such as methyl, acryl, methacryl and others, by aryl group, such as phenyl, tryl and others, b cycloalkyl group such as cyclohexyl, cyclobutyl and others, and by groups having hydrogen groups bonding with carbon atoms of the above-listed hydrocarbon groups partially substituted with halogen atoms, cyano groups, mercapto groups and others, the $R^2$ being combinations of the same kind groups or different kind groups.

a is larger than 0 and smaller than 1 exclusive of 1. When a is 0, unpreferably the ethylenepolymer and the hydrocarbon compound expressed by Formula (B) do not react with each other. When a is 1 or larger than 1, unpreferably the molding produced from the composition according to this invention is too hard. Preferably a is 0.0004–0.06. It is preferable that b is larger than 0.5 inclusive of 0.5 and smaller than 3 exclusive of 3. When b is smaller than 0.5 inclusive of 0.5, the composition according to this invention cannot be kneaded readily and has poor moldability. When b is larger than 3 inclusive of 3, unpreferably the molding produced from the composition according to this invention is too hard. Preferably b is 1–2.

The organopolysiloxane used in this invention may have a chain molecular structure, branched chain molecular structure, cyclic molecular structure, recticular molecular structure, stereorecticular molecular structure, etc.

The polymerization ratio of the organopolysiloxane used in this invention is not specifically limited by a suitable polymerization ratio which does not bother its kneading with the ethylene polymer. Preferably the polymerization ratio is above 250.

The hydrocarbon compound expressed by Formula (B) used in this invention is exemplified by 1,4-pentadiene, 1,5 hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, or others.

The organopolysiloxane expressed by Formula (A) used in this invention is added by more 0.01 weight parts, preferably 0.05-300 weight parts, to 100 weight parts of the ethylene polymer. When the organopolysiloxane is added by less than 0.01 weight parts, the resultant resin does not exhibit properties inherent to silicone readily. When it is added by more than 300 weight parts, the resultant resin cannot be molded into film easily.

The hydrocarbon expressed by Formula (B) used in this invention is added by more than 0.01 weight parts. When the hydrocarbon is added by less than 0.01 weight parts, a numbers of masses of the crosslinked silicone are created.

The kneaded resin composition according to this invention may contain oxidation stabilizers, UV stabilizers, inorganic fillers, pigments, flame retarders, rubbers, etc.

The kneaded resin composition according to this invention can be molded by the injection molding, blow molding, etxtrusion molding, etc. The composition is heat-kneaded by usual kneaders, such as Banbury mixers, twin-screw extruders, etc.

It is preferable that the heating temperature is as low as possible. For example, when ethylene-vinyl acetate copolymer is chose as the ethylene polymer, a temperature lower than 170° C. is preferable. If it is heated at a temperature higher than 170° C., the decomposition odor will become stronger. Preferably the heating period of time is more than 30 minutes.

EXAMPLES

Example 1

One hundred (100) weight parts of ethylene-vinyl acetate copolymer (made by Nippon Unicar) having a melt index of 2.5 g/10 mins. (190° C., 2160 g) and 18 wt% of vinyl acetate content, 100 weight parts of silicone gum stock (made by Nippon Unicar) having a viscosity of 300,000 CS at 23° C. and a 1.0% of methyl vinylsilicone, 1 part of 1,9-decadiene, and 0.1 parts of IRGANOX 1010 (an antioxidant made by Ciba Gaigy) were kneaded at 100° C. for 10 minutes and at 165° C. for 70 minutes to be formed by the compression molding into a 1 mm-thick sheet. This sheet had little decomposition odor and no inhomogeneous portions. The resultant kneaded composition had a melt index of 0.2 g/10 mins., a tensile strength of 60 kg/cm$^2$ and an elongation of 500%. The resultant sheet had no exudation of the silicone on the surfaces. This sheet was pelletized, and the pellets could be extruded into a tape at 160° C. by the extruder of a Brabender Plastograph.

Control 1

In the same was as in Example 1, the components except the 1,9-decadiene were kneaded to be formed into a sheet. The sheet partially had masses of crosslinked organosilicone compound having diameters of 0.1-0.5 mm, and the resultant sheet was not homogeneous.

Example 2

One hundred (100) weight parts of ethylene-vinyl acetate copolymer (made by Nippon Unicar) having a melt index of 1.5 g/10 mins. and a vinyl acetate content of 15 weight %, 100 weight parts of silicone gum stock (made by Nippon Unicar) having a viscosity of 300,000 CS at 23° C. and a methyl vinylsilicone content of 5.0%, 2 parts of 1,9-decadiene, and 0.1 parts of IRGANOX 1010 (an antioxidant made by Ciba Gaigy) were kneaded at 100° C. for 10 minutes by a Brabender Plastograph and at 165° C. for 40 minutes to be formed into a 1-mm thick sheet by the compression molding. The resultant kneaded composition had a melt index of 0.1 g/10 mins., a tensile strength of 70 kg/cm$^2$, an elongation of 300%. The resultant sheet had no exudation of the silicone. This sheet was formed in to pellets, and the pellets could be formed into a tape at 160° C. by the extruder of a Brabender Plastograph.

Example 3

One hundred (100) weight parts of ethylene-butene-1 copolymer (made by Union Carbide) having a melt index of 4.7 g/10 mins. and a density of 0.900, 100 parts of silicon gum stock having a viscosity of 300,000 CS at 23° C. and a methyl vinylsilicone of 5.0%, 2 weight parts of 1,9-decadiene, and 0.1 parts of IRGANOX 1010 (an antioxidant made by CibaGaigy) were kneaded for 10 minutes at 100° C. and for 70 minutes at 165° C. to be formed into a 1-mm thick sheet by the compression molding. The resultant kneaded composition had a melt index of 0.2 g/10 mins., a tensile strength of 50 kg/cm$^2$ and an elongation of 600%. The resultant sheet had substantially no exudation of the silicone. This sheet was formed into pellets, and the pellets were formed into a tape at 160° C. by the extruder of a Brabender Plastograph.

Example 4

One hundred (100) weight parts of polystyrene having a melt flow index (200° C., 5,000 g) and an Izod impact strength of 1.3 kg.cm/cm (with a notch) at 10.0 g/10 mins., and 10 parts of the pellets prepared in Example 1 were kneaded at 200° C. for 10 minutes by a Brabender Plastograph and then was taken out to be formed into a sheet. The resultant sheet had an Izod impact strength of 3.0 kg.cm/cm.

What is claimed is:

1. A kneaded moldable resin composition comprising 100 weight parts of an ethylene polymer; 0.01-300 weight parts of an organopolysiloxane expressed by the formula $$R_a^1 R_b^2 SiO_{\frac{4-a-b}{2}} \quad (A)$$

(where $R^1$ is an aliphatic unsaturated group, $R^2$ is a substituted or unsubstituted monovalent hydrocarbon group containing no aliphatic unsaturated group, $0 < a < 1$, $0.5 < b < 3$, and $1 < a+b < 3$); 0.01−30 weight parts of a hydrocarbon compound expressed by the formula $$CH_2=CH(CH_2)_c CH=CH_2 \quad (B)$$

(where c is an integer of 1-30) which are heat-kneaded with each other.

2. A molding produced from a kneaded moldable resin composition according to claim 1.

* * * * *

UNITED STATES PATENT AND TRADEMARK OFFICE
CERTIFICATE OF CORRECTION

PATENT NO. : 5,017,635
DATED : May 21, 1991
INVENTOR(S) : Akitaka Senuma, et al It is certified that error appears in the above-identified patent and that said Letters Patent is hereby corrected as shown below:

On the title page:, Item [73] "Union Carbide Chemicals and Plastics Company Inc., Danbury, Conn." should read --Nippon Unicar Company Limited, Tokyo, Japan--.

Signed and Sealed this

Sixth Day of April, 1993

Attest:

STEPHEN G. KUNIN

*Attesting Officer*  *Acting Commissioner of Patents and Trademarks*